(12) United States Patent
White, Jr. et al.

(10) Patent No.: US 6,179,324 B1
(45) Date of Patent: Jan. 30, 2001

(54) VEHICLE INFLATABLE SIDE CURTAIN ASSEMBLY

(75) Inventors: Michael J. White, Jr., Shelby Township; Robert I. Phillion, Ray Township; Rodger M. Cherry, Grosse Pointe Woods, all of MI (US)

(73) Assignee: TRW Vehicle Safety Systems Inc., Lyndhurst, OH (US)

(*) Notice: Under 35 U.S.C. 154(b), the term of this patent shall be extended for 0 days.

(21) Appl. No.: 09/228,313

(22) Filed: Jan. 11, 1999

(51) Int. Cl.$^7$ ..................................................... B60R 21/22
(52) U.S. Cl. ...................... 280/730.2; 280/728.2; 280/743.1
(58) Field of Search ............... 280/730.2, 728.1, 280/728.2, 730.1, 743.1

(56) References Cited

U.S. PATENT DOCUMENTS

| | | |
|---|---|---|
| 3,687,485 | 8/1972 | Campbell . |
| 5,265,903 | * 11/1993 | Kuretake et al. ................. 280/730.2 |
| 5,362,097 | 11/1994 | Barske . |
| 5,462,308 | * 10/1995 | Seki et al. ..................... 280/730.2 X |
| 5,540,459 | 7/1996 | Daniel . |
| 5,605,346 | 2/1997 | Cheung et al. . |
| 5,755,457 | 5/1998 | Specht ............................. 280/730.2 |
| 5,788,270 | 8/1998 | Haland et al. . |
| 5,791,683 | * 8/1998 | Shibata et al. ................... 280/730.2 |
| 5,884,937 | * 3/1999 | Yamada ........................ 280/743.1 X |
| 5,921,575 | * 7/1999 | Kretschmer et al. ............ 280/730.2 |
| 5,938,233 | * 8/1999 | Specht ............................. 280/730.2 |
| 5,941,564 | 8/1999 | Acker . |
| 6,073,961 | 6/2000 | Bailey et al. . |
| 6,079,732 | 6/2000 | Nakajima et al. . |
| 6,079,735 | 6/2000 | Fallmann et al. . |
| 6,082,761 | 7/2000 | Kato et al. . |

FOREIGN PATENT DOCUMENTS

406227340 * 8/1994 (JP) ................................... 280/730.2

OTHER PUBLICATIONS

Co–pending U.S. Patent Appln. Serial No. 09/119,695, filed Jul. 21, 1998, entitled "Vehicle Headliner with inflatable Side Curtain".

* cited by examiner

Primary Examiner—Daniel G. DePumpo
Assistant Examiner—F. Zeender
(74) Attorney, Agent, or Firm—Tarolli, Sundheim, Covell, Tummino & Szabo L.L.P.

(57) ABSTRACT

A roof (40) and side structure (20) of a vehicle at least partially define a safety apparatus mounting chamber (70). The mounting chamber (70) has an opening (74) defined between an edge portion (68) of a vehicle headliner (58) and the vehicle side structure (20). An inflatable protection device (80) is inflatable between a vehicle occupant and the vehicle side structure (20). A cover (90) at least partially encloses the protection device (80) within the mounting chamber (70) when the protection device is in a deflated condition. The cover (90) has a trim portion (140) which extends from the mounting chamber (70) into the opening (74) and which has an outer surface (144) exposed to the vehicle occupant compartment (72). The trim portion (140) of the cover (90) has a closed condition in which a first edge portion (146) of the trim portion is in abutting engagement with the edge portion (68) of the headliner (58). A second edge portion (148) of the trim portion (140) is in abutting engagement with the side structure (20). The trim portion (140) of the cover (90) thereby closes the opening (74).

15 Claims, 3 Drawing Sheets

VEHICLE INFLATABLE SIDE CURTAIN ASSEMBLY

BACKGROUND OF THE INVENTION

1. Technical Field

The present invention relates to a vehicle safety apparatus. In particular, the present invention relates to an inflatable vehicle occupant protection device, such as a side curtain, for helping to protect an occupant of a vehicle in the event of a side impact to the vehicle.

2. Description of the Prior Art

It is known to inflate an air bag to help protect a vehicle occupant in the event of a vehicle collision. Some vehicles include an air bag in the form of a side curtain which is inflatable downward adjacent the side structure of the vehicle to help protect a vehicle occupant in the event of a side impact to the vehicle.

The side curtain is typically stored in a deflated condition along the roof rail above the side windows of the vehicle. The side curtain is part of a module including an inflator. The module is attached to the sheet metal of the vehicle and then is covered with a trim panel. A separate headliner extends laterally inward from the trim panel, inside the roof of the vehicle. The side curtain inflates through the trim panel, either by moving the trim panel out of the way or by opening the trim panel at a predetermined weakened portion or tear seam.

SUMMARY OF THE INVENTION

The present invention is a vehicle occupant safety apparatus for helping to protect an occupant of a vehicle having a roof, a side structure, and a headliner extending adjacent the roof. The roof and side structure at least partially define a safety apparatus mounting chamber in the vehicle. The side structure and the headliner at least partially define a vehicle occupant compartment. The mounting chamber terminates in an opening defined between a terminal edge portion of the headliner and the vehicle side structure.

The safety apparatus comprises an inflatable vehicle occupant protection device having a deflated condition and having an inflated condition in which the protection device is inflated between the occupant and the vehicle side structure. The apparatus also comprises a cover at least partially enclosing the protection device within the mounting chamber when the protection device is in the deflated condition. The cover has a trim portion which extends from the mounting chamber into the opening and which has an outer surface exposed to the vehicle occupant compartment. The trim portion of the cover has a closed condition in which a first edge portion of the trim portion is in abutting engagement with the terminal edge portion of the headliner and a second edge portion of the trim portion is in abutting engagement with the side structure so that the trim portion of the cover closes the opening.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
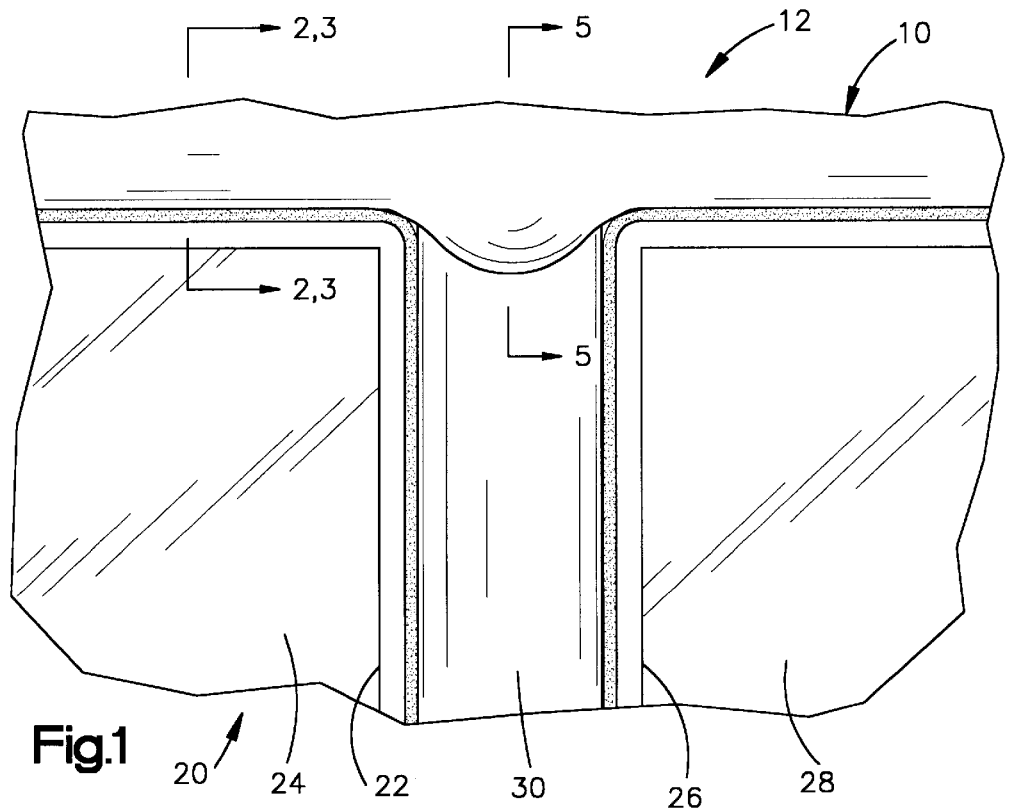
FIG. 1 is a schematic side view of a portion of a vehicle including a safety apparatus constructed in accordance with the present invention.

The present invention relates to a vehicle safety apparatus. In particular, the present invention relates to an inflatable vehicle occupant protection device, such as a side curtain assembly, for helping to protect a vehicle occupant in the event of a side impact to a vehicle. As representative of the present invention, FIG. 1 illustrates schematically a vehicle safety apparatus 10 for helping to protect an occupant of a vehicle 12.

The vehicle 12 has a side structure 20 (FIGS. 1–4) which includes a front door 22 and a front side window 24. The vehicle side structure 20 also includes a rear door 26 and a rear side window 28. The vehicle B-pillar 30 is disposed between the front side window 24 and the rear side window 28. The side structure 20 also includes the vehicle A-pillar and C-pillar (not shown).

A metal roof panel 40 of the vehicle 12 extends laterally in the vehicle, from the vehicle side structure 20 past the vehicle centerline. When a vehicle occupant sits in the front seat (not shown) of the vehicle 12, the occupant is adjacent to the vehicle front door 22 and front window 24. The side of the occupant's head is adjacent to the front window 24. The top of the occupant's head is adjacent to the roof panel 40.

Figure 2:
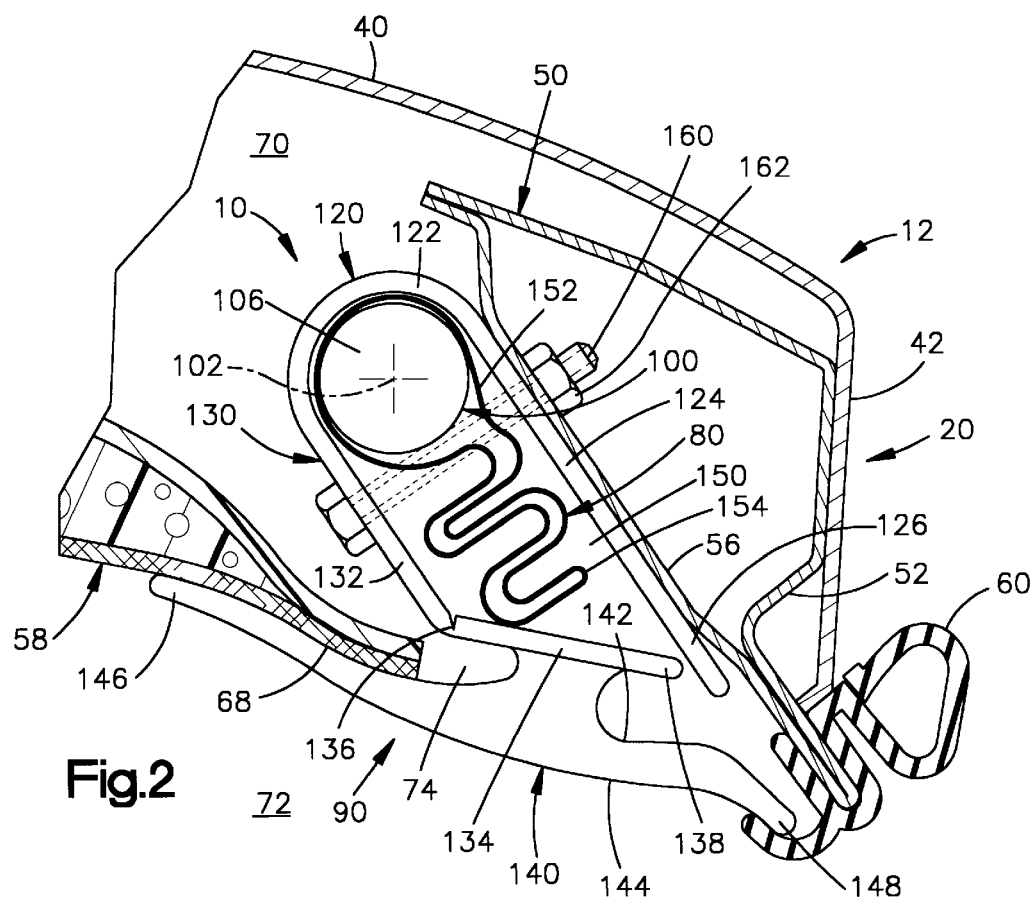
FIG. 2 is a sectional view, taken generally along line 2—2 of FIG. 1, of the vehicle safety apparatus of FIG. 1 including a side curtain shown in a deflated condition.
Figure 3:
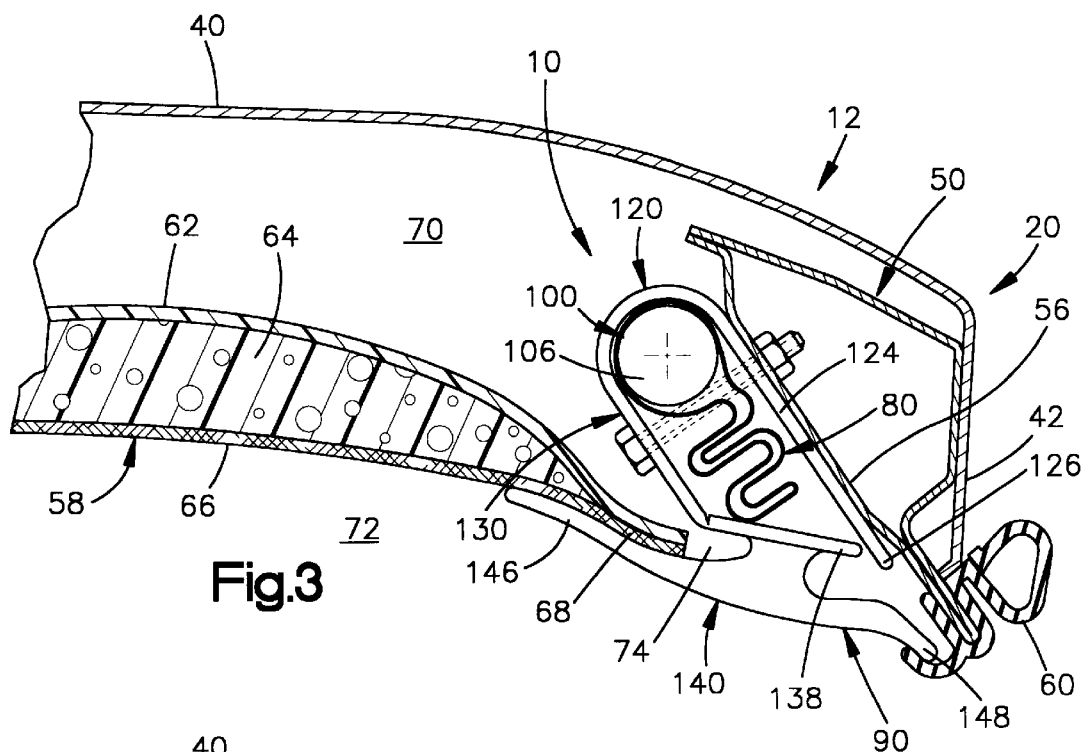
FIG. 3 is a sectional view similar to FIG. 2 and showing additional portions of the side structure of the vehicle.
Figure 4:
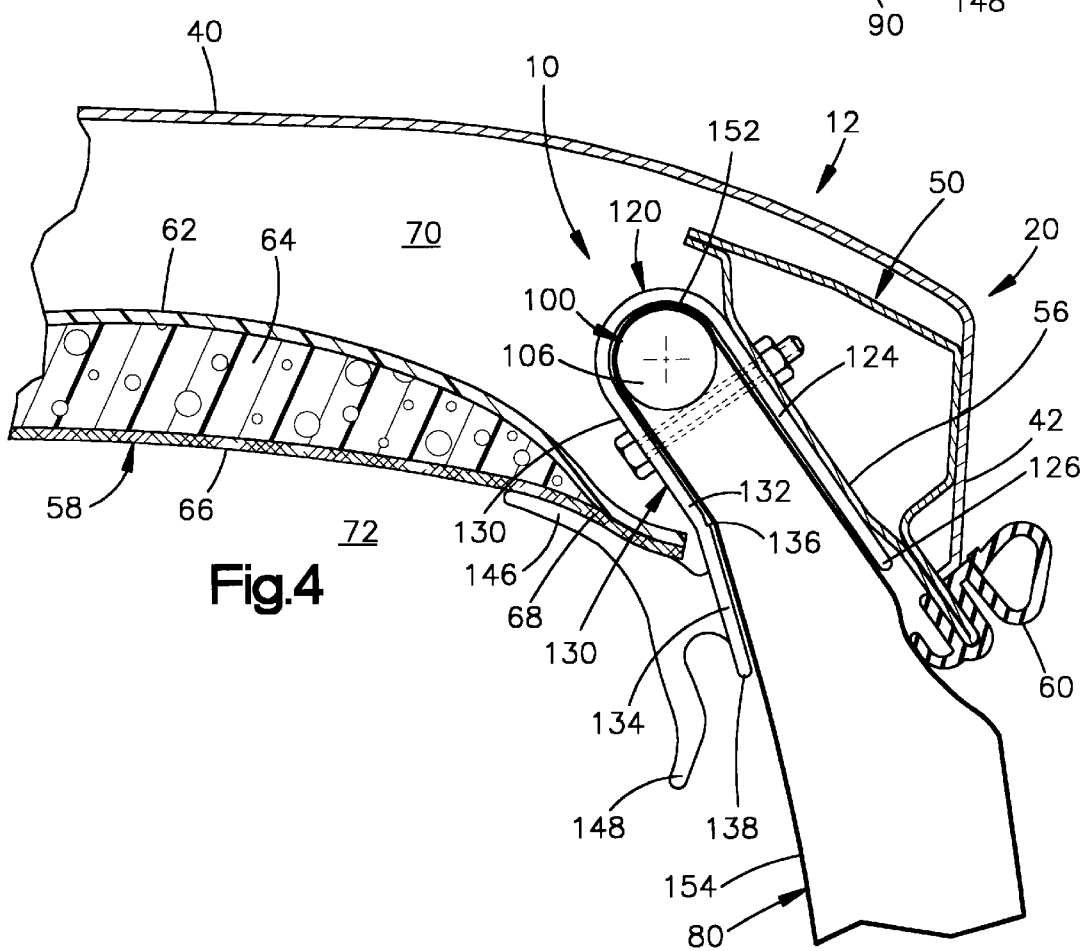
FIG. 4 is a view similar to FIG. 3 showing the side curtain in an inflated condition.

As illustrated in FIG. 2 and 3, the roof panel 40 has an outer edge portion 42. The vehicle side structure includes a metal cant rail 50 adjacent the roof panel 40. The cant rail 50 has an outer edge portion 52 welded to the outer edge portion 42 of the roof panel 40. The cant rail 50 also includes an inner panel 56. The outer edge portion 42 of the roof panel 40, together with the cant rail 50, forms the roof rail of the vehicle.

The vehicle side structure 20 also includes a bulb seal 60 which is supported on the outer edge portion 42 of the roof panel 40 and the outer edge portion 52 of the cant rail 50. The vehicle front door 22 (not shown in FIGS. 2–3), which supports the front side window 24, is engageable with the bulb seal 60 when the door is closed.

The vehicle 12 includes a headliner 58. The headliner 58 includes a relatively rigid plastic backer 62, a foam layer 64, and a fabric inner layer 66. The headliner 58 has a terminal edge portion 68 which is laterally outermost in the vehicle, closest to the vehicle side structure 20.

The roof panel 40, the headliner 58, and the cant rail 50 define a safety apparatus mounting chamber 70 in the vehicle 12. The vehicle side structure 20 and the headliner 58 define a vehicle occupant compartment 72. The terminal edge portion 68 of the headliner 58 and the vehicle side structure 20 define an opening 74 between the safety apparatus mounting chamber 70 and the vehicle occupant compartment 72.

The safety apparatus 10 includes a side curtain 80 (FIGS. 2–4) and an inflator (not shown) for inflating the side curtain 80. The inflator preferably contains a stored quantity of pressurized inflation fluid in the form of gas to inflate the side curtain 80. The inflator alternatively could contain a combination of pressurized inflation fluid and ignitable material for heating the inflation fluid, or could be a pyrotechnic inflator which uses the combustion of gas-generating material to generate inflation fluid. The safety apparatus 10 also includes a cover 90 and a fill tube 100.

The fill tube 100 has a cylindrical configuration centered on an axis 102. The inner side surface of the fill tube 100 defines a fluid flow passage 106 in the fill tube. A series of nozzles or outlets (not shown) are formed in the fill tube 100 at spaced locations along its length.

The cover 90 is injection molded as one piece from a plastic material. The cover 90 is made from a material which is strong enough to protect the parts of the vehicle safety apparatus 10 which are enclosed within the cover. The material of the cover 90 is soft enough, that is, sufficiently flexible or deformable, to be opened upon actuation of the inflator. The material of the cover 90 is one on which a Class A interior surface can be formed. A preferred material for the cover 90 is DuPont Hytrel DYM 100 brand thermoplastic polyester elastomer, having a material thickness of about 2 mm. This preferred material is available from E. I. DuPont de Nemours & Co. of Wilmington, Del.

The cover 90 includes a mounting portion 120 having an elongate, tubular configuration. The base 122 of the mounting portion 120 has an arcuate configuration which extends for 180 degrees around the fill tube 100.

An outer leg 124 of the mounting portion 120 extends from the base 122, along the inner panel 56 of the cant rail 50, in a direction toward the outer edge portion 52 of the cant rail. The outer leg 124 of the mounting portion 120 of the cover 90 has an outer edge portion 126 disposed adjacent to or in the opening 74 between the headliner 58 and the side structure 20.

An inner leg 130 of the mounting portion 120 extends from the base 122, in a direction generally parallel to the outer leg 124. The inner leg 130 of the mounting portion 120 has first and second sections 132 and 134 flexibly interconnected by a hinge portion 136. The second section 134 of the inner leg 130 has an outer edge portion 138. The outer edge portion 138 of the inner leg 130 is in abutting engagement with the outer edge portion 126 of the outer leg 124, adjacent to or in the opening 74 between the headliner 58 and the side structure 20.

The cover 90 includes a trim portion 140 which extends from and is movable with the second section 134 of the inner leg 130 of the mounting portion 120 of the cover. The trim portion 140 has a generally panel-like configuration including inner and outer side surfaces 142 and 144. The inner side surface 142 is presented toward the second section 134 of the inner leg 130 of the mounting portion 120 of the cover 90. The outer side surface 144 of the trim portion 140 is a Class A surface exposed to the vehicle occupant compartment 72. The trim portion 140 of the cover 90 is the visible portion of the cover in the vehicle 12.

The trim portion 140 is disposed in the opening 74, and/or extends from the mounting chamber 70 into the opening 74. The trim portion 140 has a inner edge portion 146 in abutting engagement with the terminal edge portion 68 of the headliner 58. An outer edge portion 148 of the trim portion 140 is in abutting engagement with and underlies the bulb seal 60. As a result, the trim portion 140 of the cover 90 closes the opening 74 to the safety apparatus mounting chamber 70.

The base 122 of the cover 90, the inner and outer legs 124 and 130, and the trim portion 140 together define a substantially closed chamber 150 in the cover. The cover 90 encloses the side curtain 80 within the chamber 150 when the side curtain is in the deflated condition. A small gap of about 1 millimeter may be present between the outer edge portions 126 and 138 of the inner and outer legs 124 and 130 of the cover 90. Alternatively, the inner and outer legs 124 and 130 can touch, and may be releasably held together by a tab and slot assembly such as indicated schematically at 151 in FIG. 5.

The side curtain 80 has a mounting portion 152 and an occupant contact portion 154. The mounting portion 152 of the side curtain 80 extends circumferentially around the fill tube 100. The fill tube 100 extends axially through the mounting portion 152 of the side curtain 80. The occupant contact portion 154 of the side curtain 80 is connected in fluid communication with the mounting portion 152 of the side curtain.

The safety apparatus 10, including the fill tube 100, the side curtain 80 (in its deflated condition), the cover 90, and the inflator, is stored in the safety apparatus mounting chamber 70 in the vehicle 12, between the headliner 58 and the vehicle side structure 20 or roof panel 40. A plurality of fasteners in the form of bolts 160, spaced along the length of the safety apparatus 10, secure the safety apparatus to the cant rail 50. The bolts 160 extend through openings in the cover 90 and through slits in the side curtain 80. The bolts 160 are screwed into nuts 162 welded to the cant rail 50.

When the side curtain 80 is in the deflated condition, the trim portion 140 of the cover 90 is in a closed condition as shown in FIGS. 2 and 3. In this condition, the inner edge portion 146 of the trim portion 140 is in abutting engagement with the terminal edge portion 68 of the headliner 58. The outer edge portion 148 of the trim portion 140 is in abutting engagement with the vehicle side structure 20. The trim portion 140 of the cover 90 thus closes the opening 74.

Figure 5:
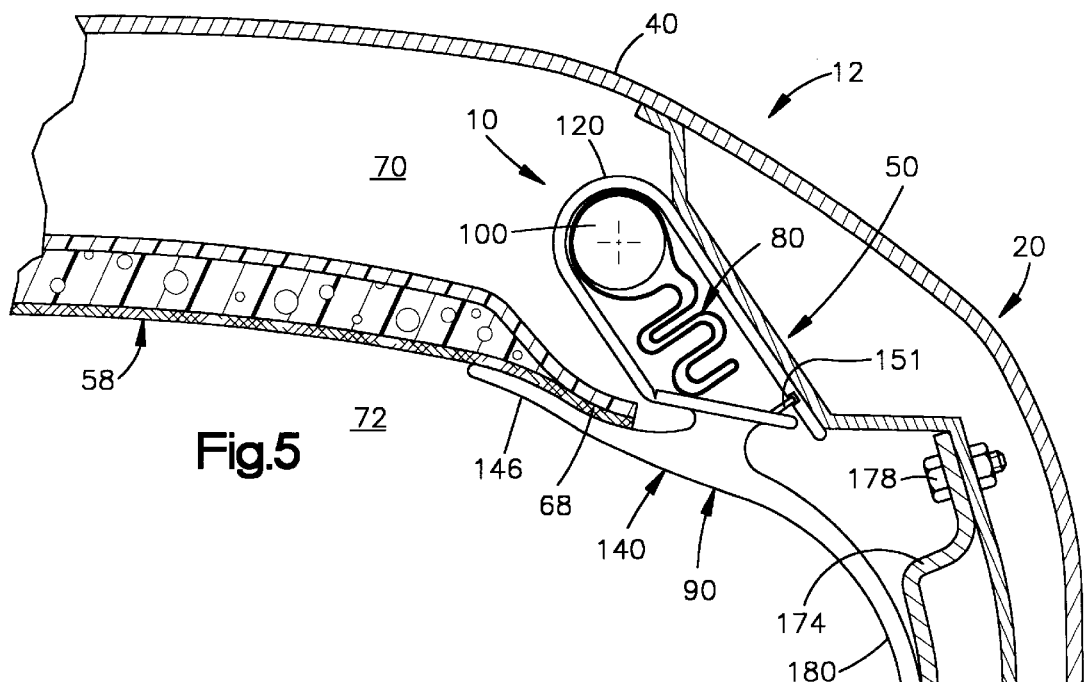
FIG. 5 is a view similar to FIG. 3 taken generally along line 5—5 of FIG. 1, at the B-pillar of the vehicle.

FIG. 5 illustrates the configuration of the safety apparatus 10 at the location of the B-pillar 30 of the vehicle 12. The B-pillar 30 includes two structural metal panels 170 and 172 and an inner trim panel 174. A clip 176 on the back of the trim panel 174 attaches the trim panel to the metal panel 172. In addition, a bolt 178 attaches the top end of the trim panel 174 to the metal panel 172. The bolt 178 is covered by a downwardly projecting portion 180 (FIGS. 1 and 4) of the trim portion 140 of the safety apparatus cover 90.

The safety apparatus 10 includes electric circuitry (not shown) including a sensor for sensing a vehicle condition such as a side impact to the vehicle 12 or a vehicle rollover condition. The electric circuitry also includes a controller for actuating the inflator in response to the output of the sensor. Upon the occurrence of a vehicle condition for which inflation of the protection device 12 is desired to help protect the occupant of the vehicle, the sensor and the controller cooperate to send an actuation signal to the inflator over lead wires. The inflator is actuated and inflation fluid is directed from the inflator into the fluid flow passage 106 in the fill tube 100. Inflation fluid flows out of the fill tube 100 into the mounting portion 152 of the side curtain 80 and begins to inflate the occupant contact portion 154 of the side curtain.

The inflating side curtain 80 presses outwardly on the second section 134 of the inner leg 130 of the cover 90. The inner leg 130 of the cover 90 pivots open at the hinge portion 136, enabling the second section 134 and the trim portion 140 to move out of the opening 74, to the open condition shown in FIG. 4. The outer edge portion 148 of the trim portion 140 of the cover 90 moves away from the bulb seal 60. The occupant contact portion 154 of the side curtain 80 inflates into the vehicle occupant compartment 72, as shown in FIG. 3. The side curtain 80 inflates generally vertically downward in the vehicle 12, adjacent the side structure 20 of the vehicle, to help protect an occupant of the vehicle.

As the side curtain 80 inflates, it needs to move only the trim portion 140 of the cover 90 out of its way, in order to inflate into the vehicle occupant compartment 72. In addition, no extra vehicle parts such as trim panels are needed to cover the opening 74 into the safety apparatus mounting chamber 70. Further, the trim portion 140 of the cover 90 remains securely attached to the vehicle 12 when the side curtain 80 inflates.

Figure 6:
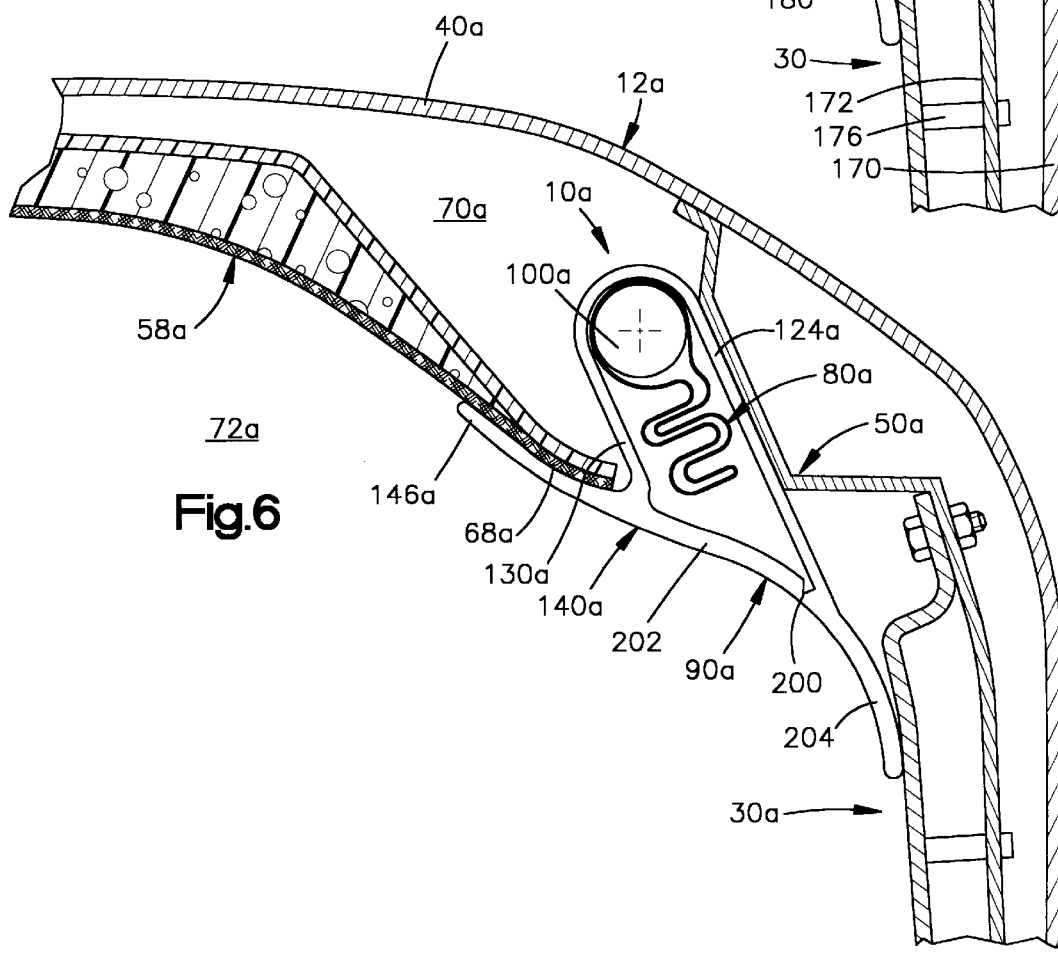
FIG. 6 is a view similar to FIG. 3 showing a vehicle safety apparatus constructed in accordance with a second embodiment of the present invention.

FIG. 6 illustrates a safety apparatus 10*a* constructed in accordance with a second embodiment of the present invention. The safety apparatus 10*a* is similar in construction to the safety apparatus 10 (FIGS. 1–5) and parts which are the same or similar are given the same reference numerals with the suffix "a" added for clarity.

In the safety apparatus 10*a*, the cover 90*a* (FIG. 6) has a tear seam or predetermined weakened portion 200 between two exposed sections 202 and 204 of the trim portion 140*a* of the cover 90*a*. The tear seam 200 releasably connects the inner leg 130*a* of the cover 90*a* with the outer leg 124*a* of the cover. The tear seam 200 is formed in a known manner so as not to be visible to a vehicle occupant.

When the side curtain 80*a* is inflated, the force of the inflating side curtain ruptures the cover 90*a* at the tear seam 200. The cover section 202 is pivoted out of the way of the inflating side curtain 80*a* to enable the side curtain to inflate into the vehicle occupant compartment 72*a*.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle occupant safety apparatus for helping to protect an occupant of a vehicle having a roof, a side structure, and a headliner extending adjacent the roof, the roof and side structure at least partially defining a safety apparatus mounting chamber in the vehicle, the side structure and headliner at least partially defining a vehicle occupant compartment, the mounting chamber having an opening defined between an edge portion of the headliner and the vehicle side structure, said safety apparatus comprising:

an inflatable vehicle occupant protection device having a deflated condition and having an inflated condition in which said protection device is inflated between the occupant and the vehicle side structure; and a cover at least partially enclosing said protection device within the mounting chamber when said protection device is in the deflated condition, said cover being separate from the headliner, said cover having an arc-shaped base positioned in the mounting chamber and inner and outer legs that extend from opposite ends of said base in the mounting chamber, said outer leg being in abutting engagement with the vehicle side structure, said inner leg having a first portion extending from said base and a second portion hingedly connected to said first portion and pivotal relative to said first portion, said cover having a closed condition wherein said second portion is in abutting engagement with said inner leg portion to at least partially enclose said protection device in said cover when the protection device is in the deflated condition, said cover having a trim portion extending from an outer surface of said second portion and pivotal with said second portion relative to said first portion, said trim portion having an inner edge portion that overlies a portion of the headliner in abutting engagement with the headliner and an outer edge portion in abutting engagement with the vehicle side structure, said trim portion closing the opening and having an outer surface exposed to the vehicle occupant compartment when said cover is in said closed condition.

2. An apparatus as set forth in claim 1 wherein said trim portion of said cover is movable from the closed condition to an open condition because of inflation of said protection device to enable movement of said protection device out of said chamber into the inflated condition between the occupant and the vehicle side structure.

3. An apparatus as set forth in claim 2 wherein said cover has a predetermined weakened portion at which said cover is rupturable in response to inflation of said protection device to enable movement of said trim portion of said cover from the closed condition to the open condition.

4. An apparatus as set forth in claim 2 wherein said cover has a mounting portion disposed in said chamber and a hinge portion interconnecting said mounting portion and said trim portion, said trim portion being pivotable about said hinge portion relative to said mounting portion between the closed condition and the open condition.

5. An apparatus as set forth in claim 1 wherein said cover is formed as one piece from a plastic material.

6. An apparatus as set forth in claim 5 wherein said trim portion of said cover is pivotable because of inflation of said protection device from the closed condition to an open condition to enable movement of said protection device out of said chamber into the inflated condition between the occupant and the vehicle side structure.

7. An apparatus as set forth in claim 1 wherein said opening extends between the safety apparatus mounting chamber and the vehicle occupant compartment, said trim portion of said cover extending across and closing said opening, said trim portion of said cover being movable away from said opening to enable inflation of said protection device out of said chamber into the vehicle occupant compartment.

8. An apparatus as set forth in claim 1 wherein said cover is disposed at least partially behind the vehicle headliner.

9. An apparatus as set forth in claim 1 wherein said trim portion of said cover extends over a B-pillar attachment fastener of the vehicle.

10. A vehicle occupant safety apparatus for helping to protect an occupant of a vehicle having a side structure and a headliner that help define a vehicle passenger compartment, said apparatus comprising:

a side curtain having a deflated condition and having an inflated condition in which said side curtain is inflated between the occupant and the vehicle side structure; and a molded plastic cover enclosing said side curtain when said side curtain is in the deflated condition, said cover having an arc-shaped base and inner and outer legs that extend from opposite ends of said base, said outer leg being connectable to the vehicle side structure, said inner leg having a first portion hingedly connected to said base and a second portion extending from said first portion and pivotal relative to said first portion, said cover having a closed condition wherein said second portion is in abutting engagement with said inner leg portion to enclose said side curtain in said cover when the protection device is in the deflated condition, said cover having a trim portion extending from an outer surface of said second portion and pivotal with said second portion relative to said first portion, said trim portion having an inner edge portion for overlying a portion of the vehicle headliner in abutting engagement with the headliner and an outer edge portion for engaging the vehicle side structure, said trim portion having an outer surface for being exposed to the vehicle occupant compartment when said cover is in said closed condition.

11. An apparatus as set forth in claim 10 wherein said trim portion of said cover is movable because of inflation of said protection device from the closed condition to an open condition to enable movement of said protection device out of said chamber into the inflated condition to help protect an occupant of the vehicle.

12. An apparatus as set forth in claim 10 wherein said safety apparatus is mounted in a safety apparatus mounting chamber of the vehicle at least partially behind the headliner of the vehicle.

13. An apparatus as set forth in claim 10 wherein said cover is formed as one piece from a plastic material.

14. An apparatus as set forth in claim 13 wherein said trim portion of said cover is pivotable from the closed condition to an open condition because of inflation of said protection device to enable movement of said protection device out of said chamber into the inflated condition between the occupant and the vehicle side structure.

15. A vehicle occupant safety apparatus for helping to protect an occupant of a vehicle having a roof, a side structure, and a headliner extending adjacent the roof, the roof and side structure at least partially defining a safety apparatus mounting chamber in the vehicle, the side structure and headliner at least partially defining a vehicle occupant compartment, the mounting chamber having an opening defined between an edge portion of the headliner and the vehicle side structure, said safety apparatus comprising:

an inflatable vehicle occupant protection device having a deflated condition and having an inflated condition in which said protection device is inflated between the occupant and the vehicle side structure; and a cover at least partially enclosing said protection device within the mounting chamber when said protection device is in the deflated condition, said cover having a trim portion which extends from the mounting chamber into the opening and which has an outer surface exposed to the vehicle occupant compartment, said cover having a mounting portion disposed in said chamber and a hinge portion interconnecting said mounting portion and said trim portion, said trim portion being pivotable about said hinge portion relative to said mounting portion between a closed condition and an open condition, said trim portion when in said closed condition having a first edge portion in abutting engagement with the edge portion of the headliner and a second edge portion in abutting engagement with the side structure so that said trim portion of said cover closes the opening, said trim portion of said cover being movable from the closed condition to an open condition because of inflation of said protection device to enable movement of said protection device out of said chamber into the inflated condition between the occupant and the vehicle side structure.

* * * * *